Figure 1:
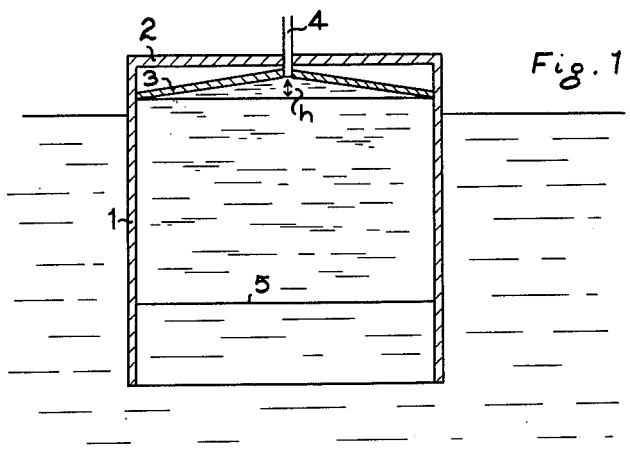

3,167,203
TANK FOR THE STORAGE OF OIL, GASOLINE AND SIMILAR LIQUIDS ON A WATER BED
John Arne Ingemund Ekstrand, Stockholm, Sweden, assignor to Ekstrand & Co. Patentaktiebolag, Stockholm, Sweden, a Swedish company
Filed Dec. 20, 1962, Ser. No. 246,155
Claims priority, application Sweden Dec. 21, 1961
5 Claims. (Cl. 220—1)

Tanks are known for the storage of oil, gasoline and other liquids which are lighter than and not miscible with water, of that type which floats on water and which through an opening in its bottom stands in contact with the surrounding water. In other words, the liquid rests on a water bed, and by the fact that the liquid is lighter than water, it will wholly or partly bear up the tank. It is also known that one, in the said tanks, can arrange an always open exhaust pipe on the tank-roof. Through this exhaust pipe pass automatically gases which through one or another reason have entered the tank. Such gases can, for example, be air which has entered the tank together with the liquid to be stored in the tank.

Tanks of this type have been constructed with a conical roof with an exhaust pipe placed at the highest point of the roof, in other words, at the tip of the cone. It has, however, become apparent that one cannot construct the roof on a tank of this type at an arbitrary slant. A strongly slanting roof has the drawback, that the liquid will not fill out the upper part of the tank but instead there is formed a gas-filled space. For the upper surface of the liquid will adjust itself at a level, with respect to the surrounding water, that is only dependent on the specific gravity of the liquid. If, therefore, the slant of the roof is so large that the highest point of the roof lies at a higher level than the level of the liquid surface, which automatically adjusts itself, there will appear a gas-filled space between the highest point of the roof and the upper surface of the liquid. This gas-filled space has a drawback that it brings about a relatively large amount of evaporation of the liquid. With a tank which contains a combustible liquid there will be the further drawback of an increased risk of explosions. In order to obtain a small evaporation and a low risk of explosion one must, in accordance with the invention, have substantially all of the upper part of the tank filled with liquid. This implies that the height difference between the highest and the lowest point of the roof must be relatively small. By the invention, the tank is characterized in that the roof can, at most, have such a slant, that the height difference $h$ in centimeters between the highest and the lowest point of the roof, at most amounts to $$\frac{V}{Y \cdot 6}$$

where $V$ is the weight of the tank in kilograms and $Y$ is the area of the horizontal cross section of the tank in square meters. Preferably, said height difference shall not amount to more than $$\frac{V}{Y \cdot 9}$$

especially in case of a relatively heavy liquid, for instance having a specific weight of 0.9–1.0 kg./dm.$^3$.

To illustrate the results which the above formula leads to, we shall consider a tank of the type illustrated in FIG. 1 on the annexed drawing. The tank consists of a cylindrical mantel 1 and a double roof, consisting of a plane outer roof 2 and a conical inner roof 3, which together form a float, which keeps the tank afloat even when the tank contains so little liquid, that the lifting capacity of the liquid is insufficient, by itself, to keep the tank afloat. The height difference between the highest and the lowest points of the roof is labelled "$h$" and is the same as the height of the cone which makes up the inner roof. At the tip of the cone there is provided an open exhaust pipe 4. The tank is shown floating in water and partly filled with gasoline that has a specific gravity of 0.7 kg./dm.$^3$. The dividing surface between the gasoline and the water is labelled 5. The tank has, as is seen, no bottom.

A tank of this construction made out of sheet metal and with a diameter of 20 meters and a wall height of 15 meters weighed 126,000 kilograms. An "$h$" value of 67 centimeters was obtained by the above formula. This means that if the conical inner roof 3 is formed with a height $h$ less than 67 centimeters, then the upper level of the gasoline will stand a bit up in the pipe 4. If, on the other hand, the conical inner roof 3 is formed with a height $h$ of more than 67 centimeters, one risks that the upper surface of the gasoline will stand so far under the tip of the cone, so that there forms a gas-filled space highest up in the tank, that may be so large, that considering the explosion risk, it can not be tolerated.

A tank of the same type but constructed of a plastic material weighed 15,000 kilograms. With the same formula an "$h$" value of 8 centimeters was obtained. The permitted values for the height difference between the lowest and the highest points of the roof will therefore be considerably smaller for a lighter tank.

Figure 2:
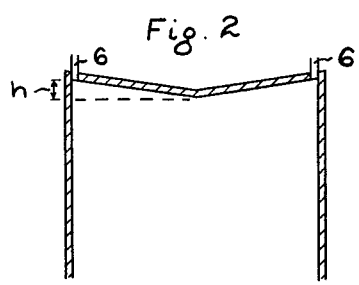
Figure 3:
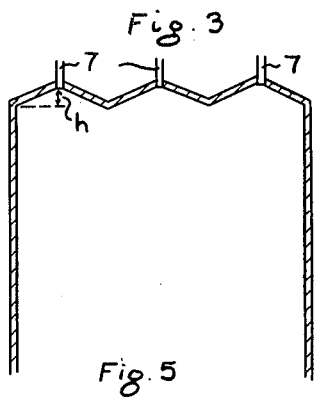
Figure 4:
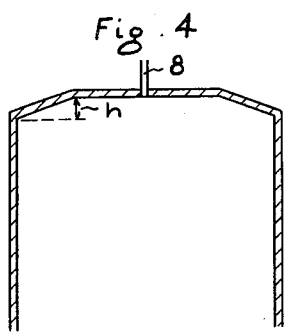
Figure 5:
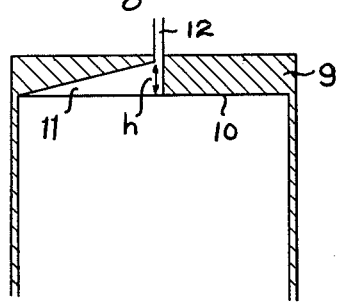

FIGS. 2–5 show schematically some other construction forms for the tank according to the invention. The roof in FIG. 2 is conical but with the tip of the cone pointing downwards. Entering air will therefore flow to the walls of the tank, where several exhaust pipes 6 are placed. In FIG. 3 the roof is divided into several parts with different slants, so it contains several highest points. At these highest points the exhaust pipes 7 are placed. In FIG. 4 the roof has the form of a cone with a cut-off top, with an exhaust pipe 8 placed on the central part of the plane upper part. FIG. 5 shows an example of how only parts of the roof need to be constructed at a slant in order to lead away air or other gases. The fairly thick roof 9 has a plane underside 10. In this underside are provided tracks or grooves 11, which extend radially from the tank wall towards a centrally placed exhaust pipe 12. The height $h$ is determined by the difference between the highest and the lowest points of the grooves.

The invention includes the case that the ceiling is wholly plane and horizontally placed, when the tank is in equilibrium in water. With such a plane ceiling there appears a certain risk that the tank will tilt in an improper way, if a large amount of air suddenly enters the tank. Such a case can appear in connection with the pumping of oil from a tanker into the tank, namely when the tank in the boat is almost empty and the pump begins to pump a mixture of oil and air. To avoid the risk of the tank going awry, it is necessary to place several exhaust pipes in the plane ceiling, for example, an exhaust pipe in the middle of the ceiling and several pipes at or near the edges of the ceiling. It is preferred, however, that the ceiling, when the tank is floating in water, has such a slant that air or any other gas entering the tank moves automatically to the highest point or points of the ceiling, where the open exhaust pipes are situated.

What is claimed is:
1. A tank for storing oil, gasoline and other liquids which are lighter than and non-miscible with water, of the type which floats in water and which through an opening in its bottom stands in contact with the surrounding water, the roof of the tank being constructed with at least one open exhaust pipe to lead away gases which may enter the tank, the roof of the tank having such a slant that the height difference in centimeters between the highest and the lowest points of the roof is at most $$\frac{V}{Y \cdot 6}$$

where V is the tank's weight in kilograms and Y is the area of the horizontal cross section of the tank in square meters.

2. A tank as claimed in claim 1, in which the roof of the tank has the form of a cone with the tip directed upwards and with an exhaust pipe arranged at the tip of the cone.

3. A tank as claimed in claim 1 in which the roof of the tank is constructed of several parts with different slants and with exhaust pipes arranged at the highest points.

4. A tank as claimed in claim 1 in which the roof of the tank is constructed plane with grooves each of which slants up towards a highest point at which an exhaust pipe is arranged.

5. A tank as claimed in claim 1 in which the roof of the tank is plane and provided with several exhaust pipes, mainly placed near the edge of the roof.

References Cited in the file of this patent

UNITED STATES PATENTS

| | | |
|---|---|---|
| 116,423 | Forstall | June 27, 1871 |
| 1,901,874 | Horton | Mar. 21, 1933 |
| 2,026,762 | Verner | Jan. 7, 1936 |
| 2,601,317 | Moyer | June 24, 1952 |
| 2,924,350 | Greer | Feb. 9, 1960 |